(12) United States Patent
Sato

(10) Patent No.: US 11,965,562 B2
(45) Date of Patent: Apr. 23, 2024

(54) ROTATION TRANSMISSION DEVICE

(71) Applicant: NTN Corporation, Osaka (JP)

(72) Inventor: Koji Sato, Shizuoka (JP)

(73) Assignee: NTN Corporation, Osaka (JP)

( * ) Notice: Subject to any disclaimer, the term of this patent is extended or adjusted under 35 U.S.C. 154(b) by 263 days.

(21) Appl. No.: 17/598,023

(22) PCT Filed: Mar. 19, 2020

(86) PCT No.: PCT/JP2020/012362
§ 371 (c)(1),
(2) Date: Sep. 24, 2021

(87) PCT Pub. No.: WO2020/196289
PCT Pub. Date: Oct. 1, 2020

(65) Prior Publication Data
US 2022/0178405 A1 Jun. 9, 2022

(30) Foreign Application Priority Data
Mar. 27, 2019 (JP) .................................. 2019-060535

(51) Int. Cl.
*F16D 27/112* (2006.01)
*F16D 41/067* (2006.01)
*F16D 41/08* (2006.01)

(52) U.S. Cl.
CPC .......... *F16D 27/112* (2013.01); *F16D 41/067* (2013.01); *F16D 41/088* (2013.01)

(58) Field of Classification Search
CPC ...... F16D 27/10; F16D 24/108; F16D 27/112; F16D 27/14; F16D 41/067; F16D 41/088
See application file for complete search history.

(56) References Cited

U.S. PATENT DOCUMENTS

| 4,254,668 A | 3/1981 | Kessinger et al. |
| 2006/0185956 A1* | 8/2006 | Yasui ...................... F16D 27/14 |
| | | 192/84.8 |
| 2009/0229945 A1* | 9/2009 | Sato ...................... F16D 41/088 |
| | | 192/110 R |

FOREIGN PATENT DOCUMENTS

| JP | 54-22046 | 2/1979 |
| JP | 2-92391 | 7/1990 |

(Continued)

OTHER PUBLICATIONS

English Translation of the International Preliminary Report on Patentability and Written Opinion of the International Searching Authority dated Sep. 28, 2021, International (PCT) Application No. PCT/JP2020/012362

(Continued)

*Primary Examiner* — Richard M Lorence
(74) *Attorney, Agent, or Firm* — Wenderoth, Lind & Ponack, L.L.P.

(57) ABSTRACT

An outer member of a rotation transmission device has an opening integral with an inner peripheral portion of the outer member. Engaging elements are disposed between an inner member and the inner peripheral portion. An outer ring is fitted to the inner peripheral portion. A first snap ring is attached to the inner peripheral portion. An inner ring is fitted to an end portion of the inner member at one axial end thereof. A second snap ring is attached to the end portion through the opening. A shaft is connected to the opening so as to be rotatable in unison with and coaxially with the outer member.

7 Claims, 4 Drawing Sheets

(56) References Cited

FOREIGN PATENT DOCUMENTS

| | | |
|---|---|---|
| JP | 2005-90678 | 4/2005 |
| JP | 2007-2972 | 1/2007 |
| JP | 2007-247713 | 9/2007 |
| JP | 2009-144737 | 7/2009 |
| JP | 2010-19309 | 1/2010 |
| JP | 2010-270913 | 12/2010 |
| JP | 2016166638 A * | 9/2016 |

OTHER PUBLICATIONS

International Search Report dated Jun. 16, 2020 in International (PCT) Application No. PCT/JP2020/012362
Japanese Office Action dated Dec. 13, 2022 in corresponding Japanese Patent Application No. 2019-060535, with English machine translation.

* cited by examiner

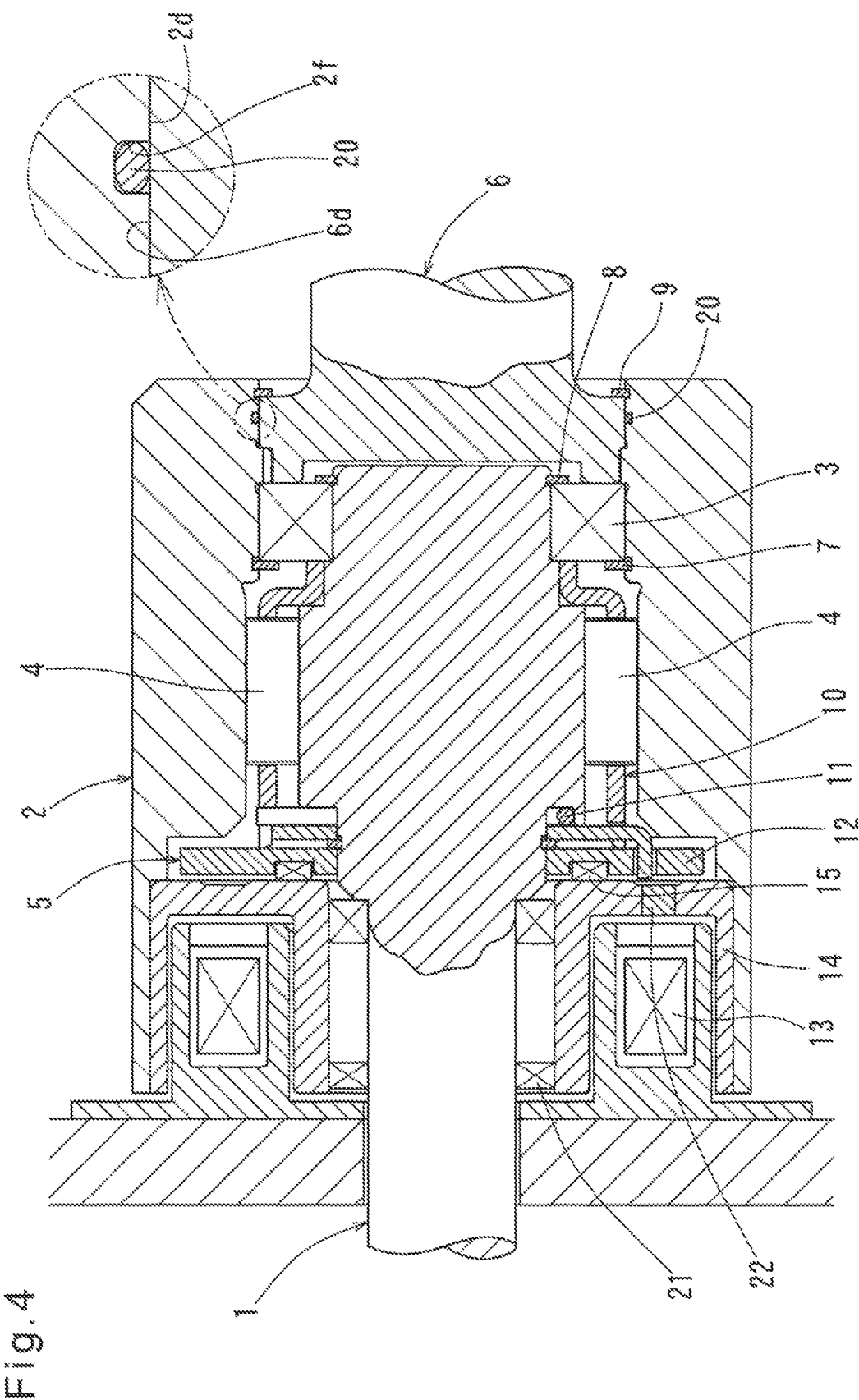

ROTATION TRANSMISSION DEVICE

TECHNICAL FIELD

The present invention relates to a rotation transmission device used to selectively perform and stop the transmission of rotation between two shafts.

BACKGROUND ART

Rotation transmission devices are known which include an inner member; an outer member having an inner peripheral portion disposed outwardly of the inner member; engaging elements disposed between the inner member and the inner peripheral portion of the outer member; and a clutch mechanism for electromagnetically switching the state of the engaging elements between an engageable state in which the engaging elements can engage with the inner and outer members, and an unengageable state in which the engaging elements cannot engage with the inner and outer members. In such a rotation transmission device, while ensuring sufficiently large torque transmission capacity between the outer and inner members through the engaging elements, it is possible to control the transmission and stopping of the torque using an electromagnetic clutch mechanism that is relatively small in torque transmission capacity.

The clutch mechanism includes a cage including pillars which circumferentially receive the engaging elements, an electromagnet, etc. While the electromagnet is in its excited state or non-excited state, the cage is rotatable in unison with one member of the inner and outer members, and, when the state of the electromagnet is switched to the non-excited state or the excited state, the cage is rotatable relative to the one member, and due to the relative rotation of the cage, the engaging elements are moved between their engagement position and neutral position. When the engaging elements are in the engagement position, the torque of one of the inner member and the outer member that is an input member is transmitted to the other of the inner member or the outer member, i.e., an output member through the engaging elements, which are engaged with the inner puerperal portion of the outer member and the inner member. As the engagement elements, rollers or sprags are used (e.g., Japanese Unexamined Patent Application Publication No. 2005-90678, hereinafter the JP '678 publication.

The rotation transmission device of the JP '678 publication includes a rolling bearing between the inner peripheral portion of the outer member and an end portion of the inner member at one axial end thereof. The rolling bearing allows coaxial relative rotation between the inner and outer members. A snap ring is attached to the inner peripheral portion of the outer member so as to be located on one axial end side of the outer ring of the rolling bearing. The outer member is closed, by a closing wall, on the other axial end side of the inner peripheral portion, and includes a shaft portion extending axially from the central portion of the closing wall. The shaft portion of the outer member is used for coupling to another transmission member. The closing wall of the outer member restricts the movement of the outer ring toward one axial end. The inner ring of the rolling bearing is press-fitted to the end portion of the inner member.

Patent document 1: Japanese Unexamined Patent Application Publication No. 2005-90678

However, in a rotation transmission device as disclosed in the JP '678 publication, while the outer ring of the rolling bearing is axially immovably held by the snap ring and the closing wall of the outer member, in view of how the device is assembled, it is impossible to attach a snap ring to the end portion of the inner member so as to be located on the one axial end side of the inner ring of the rolling bearing. Therefore, movement of the inner member toward the other axial end relative to the inner ring is restricted only by the press-fitting of the inner ring to the end portion of the inner member. While, normally, an axial load is not applied which causes the inner member to move toward the other axial end relative to the inner ring, if such an axial load is excessively applied due to some abnormality, and as a result, if, for example, the outer member, as the input member, rotates such that its other axial end wobbles, the inner member may be pulled out of the inner member toward the other axial end, resulting in improper movement of the components of the clutch mechanism supported on the inner member move improperly, and thus malfunction of the clutch mechanism.

SUMMARY OF THE INVENTION

It is an object of the present invention to provide a rotation transmission device in which it is possible to reliably restrict the movement of the inner member toward the other axial end relative to the inner ring of the rolling bearing disposed between the end portion of the inner member at the one axial end and the inner peripheral portion of the outer member, thereby preventing malfunction of the clutch mechanism for electromagnetically controlling the engaging elements disposed between the inner member and the inner peripheral portion of the outer member.

In order to achieve the above object, the present invention provides a rotation transmission device comprising: an inner member; an outer member having an inner peripheral portion disposed outwardly of the inner member; a rolling bearing disposed between the inner peripheral portion of the outer member and an end portion of the inner member at one axial end thereof; engaging elements disposed between the inner member and the inner peripheral portion of the outer member; a clutch mechanism configured to electromagnetically switch the state of the engaging elements between an engageable state in which the engaging elements are capable of engaging with the inner member and the outer member, and an unengageable state in which the engaging elements are incapable of engaging with the inner member and the outer member; and a first snap ring attached to the inner peripheral portion of the outer member, wherein the rolling bearing includes an inner ring fitted to the end portion of the inner member, and an outer ring fitted to the inner peripheral portion of the outer member, and wherein the first snap ring is arranged to restrict movement of the outer ring toward the other axial end, characterized in that the rotation transmission device further comprises: a shaft connected to the outer member so as to be rotatable in unison with and coaxially with the outer member and a second snap ring attached to the end portion of the inner member so as to be located on the one axial end side of the inner ring, wherein the outer member has, at the one axial end thereof, an opening integral with the inner peripheral portion, wherein the second snap ring is attachable to the end portion of the inner member through the opening, wherein movement of the inner member toward the other axial end relative to the inner ring is restricted by the second snap ring, and wherein the shaft is connected to the opening.

According to the above structure, in an assembled state where the engaging elements are disposed between the inner peripheral portion of the outer member and the inner member; the outer ring is fitted to the inner peripheral portion of the outer member; the first snap ring is attached to the inner peripheral portion of the outer member; and the inner ring is fitted to the end portion of the inner member, the second snap ring can be attached to the end portion of the inner member through the opening of the outer member, and then the shaft can be connected to the opening. Therefore, the second snap ring reliably restricts the movement of the inner member toward the other axial end relative to the inner ring, thereby preventing malfunction of the clutch mechanism.

Specifically, the following arrangement is preferably used: The rotation transmission device further comprises a third snap ring attached to the opening, the shaft includes a telescopically fitted portion coaxially fitted to the opening; and an engagement wall axially opposed to the third snap ring, and movement of the shaft in a pullout direction relative to the outer member is restricted by the third snap ring and the engagement wall. With this arrangement, it is possible to prevent, by the third snap ring and the engagement wall, the shaft from being pulled out relative to the outer member, and to unitize the shaft and the outer member as a single unit, while ensuring the coaxial arrangement of the shaft and the outer member by the fitting of the telescopically fitted portion to the opening.

More specifically, the following arrangement is preferably used: The opening includes a shoulder configured to restrict movement of the outer ring toward the one axial end, the shoulder and the shaft are fitted together by spline fitting, and the shoulder and the engagement all are axially in abutment with each other. With this arrangement, it is possible to realize the transmission of torque between the shaft and the outer member by utilizing the shoulder for restricting the outer ring, and also to restrict, by the shoulder and the engagement wall, the movement of the shaft in its insertion direction relative to the outer member.

Also, the following arrangement is preferably used: The rotation transmission device further comprises an O-ring between the opening and the telescopically fitted portion, and the opening has a groove retaining the O-ring. With this arrangement, when inserting the telescopically fitted portion of the shaft into the opening of the outer member, it is possible to retain the O-ring in the groove, and to seal the space between the telescopically fitted portion and the opening by the O-ring.

The following arrangement is preferably used: The clutch mechanism includes: a cage retaining the engaging elements; a neutral spring configured to be elastically deformed by relative rotation of the cage relative to a first member of the inner member and the outer member; an armature rotationally fixed relative to the cage; an electromagnet axially opposed to the armature; a rotor axially opposed to the armature with the rotor rotationally fixed relative to a second member of the inner member and the outer member; and a separation spring pressing the armature in a direction away from the rotor. The engaging elements are arranged so as to be movable, due to the relative rotation of the cage, between an engagement position in which the engaging elements are engaged with the outer member and the inner member, and a neutral position in which the engaging elements are not engaged with the outer member and the inner member. The armature is configured to be magnetically attracted to the rotor when the electromagnet is energized. The movement of the inner member toward the other axial end relative to the inner ring is restricted by the second snap ring within a range smaller than an air gap between the rotor and the armature. With this arrangement, the clutch mechanism can function as a clutch mechanism of the excitation actuation type, and, even when, with the electromagnet not excited, an axial load is applied which causes the inner member to move toward the other axial end relative to the inner ring, the rotor and the armature never come into abnormal contact with each other against the separation spring, thus preventing malfunction of the clutch mechanism.

Effects of the Invention

As described above, in the rotation transmission device of the present invention having the above structure, it is possible to reliably restrict the movement of the inner member toward the other axial end relative to the inner ring of the rolling bearing between the end portion of the inner member at the one axial end and the inner peripheral portion of the outer member, and thus to prevent malfunction of the clutch mechanism for electromagnetically controlling the engaging elements between the inner member and the inner peripheral portion of the outer member.

BRIEF DESCRIPTION OF THE DRAWINGS

FIG. 4 is a sectional view of a rotation transmission device according to a second embodiment of the present invention.

DETAILED DESCRIPTION OF THE INVENTION

Figure 1:
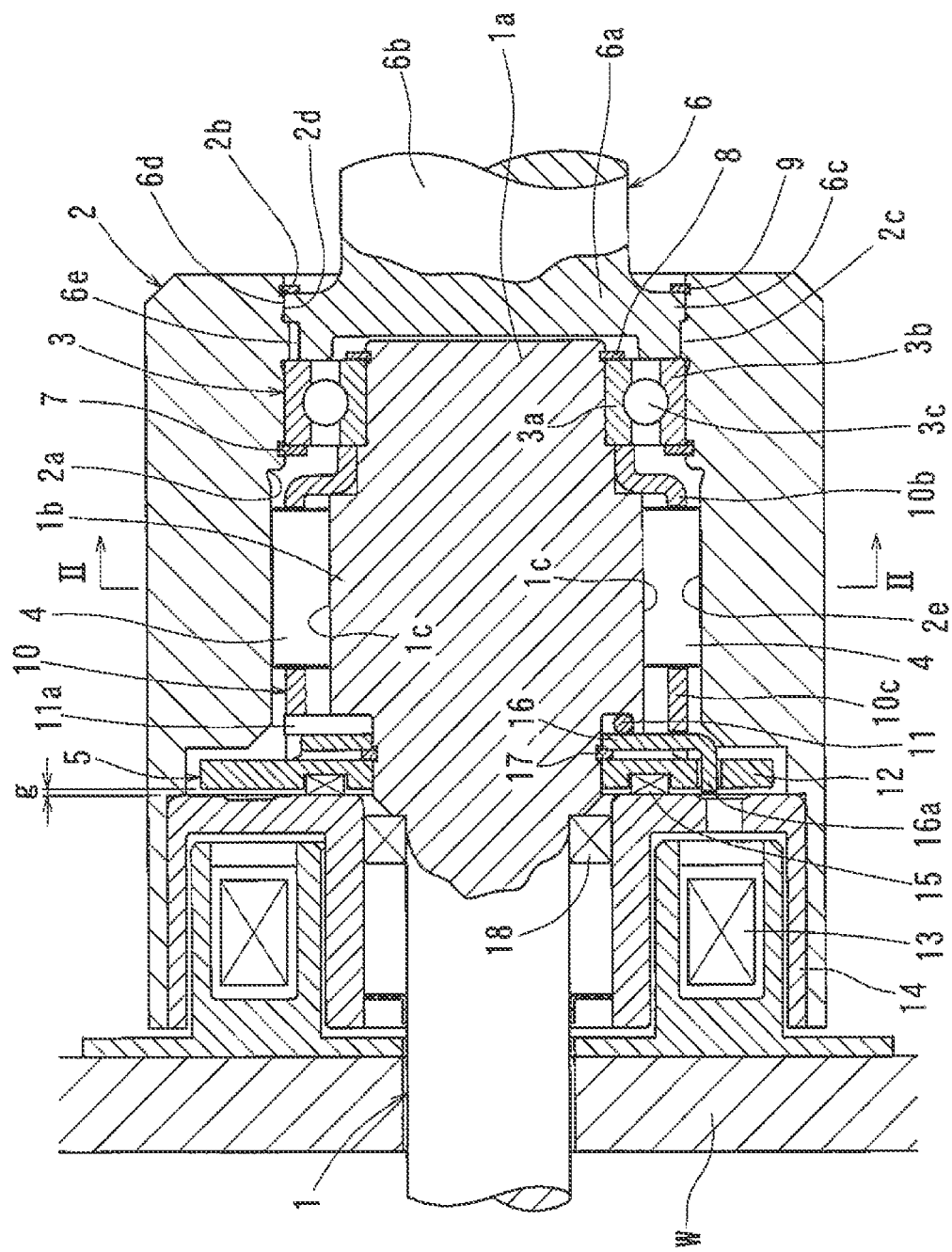
FIG. 1 is a sectional view of a rotation transmission device according to a first embodiment of the present invention.

FIG. 1 illustrates a rotation transmission device according to the first embodiment of the present invention. This rotation transmission device includes an inner member 1; an outer member 2 having an inner peripheral portion 2*a* disposed outwardly of the inner member 1; a rolling bearing 3 disposed between the inner peripheral portion 2*a* and an end portion 1*a* of the inner member 1 at one axial end (right side in FIG. 1) thereof; a plurality of engaging elements 4 disposed between the inner member 1 and the inner peripheral portion 2*a*; a clutch mechanism 5 configured to electromagnetically switch the state of the engaging elements 4 between an engageable state in which the engaging elements 4 can engage with the inner and outer members 1 and 2, and an unengageable state in which the engaging elements 4 cannot engage with the inner and outer members 1 and 2; a shaft 6 connected to the outer member 2 so as to be rotatable, in unison with, and coaxially with the outer member 2; a first snap ring 7 attached to the inner peripheral portion 2*a*; a second snap ring 8 attached to the end portion 1*a* of the inner member 1; and a third snap ring 9 attached to the outer member 2. This rotation transmission device is attached to a stationary member W such as a partition wall of a machine.

As used herein, the terms "axial" and "axially" are related to the direction along the axis (rotation center axis) of the inner and outer members 1 and 2; the terms "radial" and "radially" are related to a direction orthogonal to the above rotation center axis; and the terms "circumferential" and "circumferentially" are related to the direction about the above rotation center axis.

The inner and outer members 1 and 2 are arranged coaxially with each other. The inner member 1 is a rotary part coupled to another transmission member (not shown), and configured to transmit torque between this transmission member and the engaging elements 4. The outer member 2 is a rotary part coupled to still another transmission member (not shown) via the shaft 6, and configured to transmit torque between the shaft 6 and the engaging elements 4.

Each the inner and outer members 1 and 2 is a single seamless member.

The inner member 1, as a first member of the inner and outer members 1 and 2, includes, at its axially intermediate portion, a cam ring portion 1b radially protruding beyond the end portion 1a.

The outer member 2 is a tubular member having openings at both axial ends thereof. The inner peripheral portion 2a is radially opposed to the inner member 1. The outer member 2 has, on the one axial end side thereof, an opening 2b integral with the inner peripheral portion 2a. The opening 2b includes a spline hole-shaped shoulder 2c, and a cylindrical surface 2d formed on the one axial end side of the shoulder 2c. The inner peripheral portion 2a has an inner diameter larger than the inner diameter of the opening 2b.

The shaft 6 is a transmission shaft connected to the opening 2b, and includes a joint portion 6b inserted in the opening 2b, and a connection portion 6b axially protruding beyond the opening 2b. The shaft 6 is a stepped shaft. The joint portion 6a constitutes the large-diameter shaft portion of the shaft 6. The connection portion 6b constitutes the small-diameter shaft portion of the shaft 6, and is used for coupling to another transmission member (not shown).

The joint portion 6a includes an engagement wall 6c axially abutting against the shoulder 2c; a telescopically fitted portion 6d formed on the outer periphery of the engagement wall 6c; and a spline shaft portion 6e having a diameter smaller than the diameter of the telescopically fitted portion 6c, and extending from the engagement wall 6c toward the other axial end (left side in FIG. 1). The engagement wall 6c defines a step between the joint portion 6a and the connection portion 6b. The telescopically fitted portion 6d has a cylindrical surface fitted to the cylindrical surface 2d of the opening 2b so that the telescopically fitted portion 6d is coaxial with the cylindrical surface 2d. When the joint portion 6a is inserted into the opening 2b, due to the fitting of the joint portion 6a in the opening 2b, the center axes of the outer member 2 and the shaft 6 are aligned with each other.

The spline shaft portion 6e meshes with the spline hole-shaped shoulder 2c, and transmits torque between the outer member 2 and the shaft 6. While, in the shown example, spline fitting is used for the transmission of torque between the outer member 2 and the shaft 6, any other coupling arrangement may be used which enables the outer member 2 and the shaft 6 to rotate coaxially with and in unison with each other. For example, a different joint structure such as a two-parallel-flat-surface structure, a D-cut structure, or a key may be used.

The movement of the shaft 6 in its insertion direction relative to the outer member 2 is restricted by the axial abutment of the shoulder 2c and the engagement wall 6c.

The third snap ring 9 is fitted in a snap ring groove formed in the cylindrical surface 2c of the opening 2b on the one axial end side. The third snap ring 9 and the engagement wall 6c are axially opposed to each other. The movement of the shaft 6 in its pullout direction relative to the outer member 2 is restricted by the third snap ring 9 and the engagement wall 6c.

The third snap ring 9 is an ordinary C-shaped ring attached using snap ring pliers. The first and second snap rings 7 and 8 are also such rings.

The rolling bearing 3 supports the inner member 1 so as to be rotatable relative to the outer member 2. The rolling bearing 3 includes an inner ring 3a fitted to the end portion 1a of the inner member 1; an outer ring 3b fitted to the inner peripheral portion 2a of the outer member 2; and a plurality of rolling elements 3c disposed between the inner and outer rings 3a and 3b. The rolling bearing 3 is a deep groove ball bearing.

The one axial end of the outer ring 3b abuts against the shoulder 2c. The movement of the outer ring 3b toward the one axial end is restricted by the shoulder 2c.

The first snap ring 7 is fitted in a snap ring groove in the inner peripheral portion 2a. The movement of the outer ring 3b toward the other axial end is restricted by the first snap ring 7.

The inner ring 3a is press-fitted to the end portion 1a from the one axial end of the inner member 1, until it is brought into abutment with the cam ring portion 1b. The movement of the inner ring 3a toward the other axial end relative to the inner member 1 is restricted by the cam ring portion 1b.

The second snap ring 8 is fitted in a snap ring groove formed in the end portion 1a of the inner member 1. The second snap ring 8 is disposed on the one axial end side of the inner ring 3a, which is in abutment with the cam ring portion 1b. The movement of the inner member 1 toward the other axial end relative to the inner ring 3a is restricted by the second snap ring 8.

The outer diameter of the second snap ring 8 is smaller than the inner diameter of the opening 2b, and smaller than or equal to the outer diameter of the inner ring 3a. Before inserting the shaft 6 into the opening 2b, it is possible to attach, using snap ring pliers or a cone, the second snap ring 8 to the end portion 1a of the inner member 1 through the opening 2b.

Figure 2:
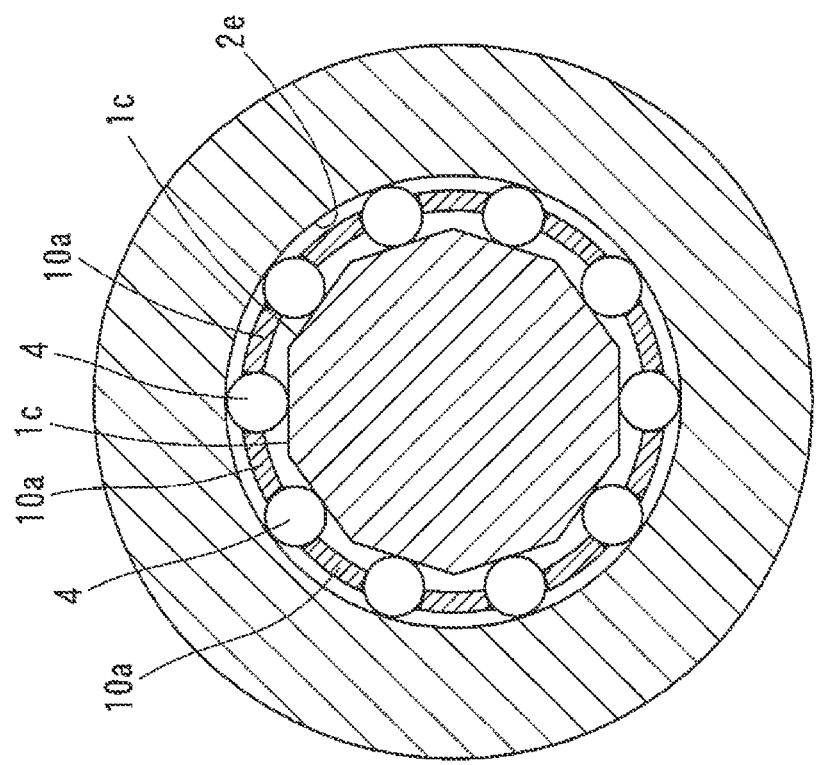
FIG. 2 is a sectional view taken along line II-II line of FIG. 1.

As illustrated in FIGS. 1 and 2, the cam ring portion 1b has, on its outer periphery, a plurality of cam surfaces 1c circumferentially spaced apart from each other. On the other hand, the inner peripheral portion 2a has a cylindrical surface 2e extending continuously in the circumferential direction. A wedge-shaped space is defined between each cam surface 1c and the cylindrical surface 2e. Instead of the inner member shown, an annular inner member including the cam ring portion 1b may be used, and another shaft may be coupled to this annular inner member.

The engaging elements 4 are rollers each disposed between the cylindrical surface 2e and a respective cam surface 1c. The radial distance between each cam surface 1c and the cylindrical surface 2e gradually decreases in one and the other of the two opposite circumferential directions from the position of the engaging element 4 shown in FIGS. 2 and 3, i.e., the circumferential center of the cam surface 1c. The engaging elements 4 are each circumferentially movable between (i) an engagement position in which the engaging element 4 is engaged with the cam surface 1c and the cylindrical surface 2e as shown by the two-dot chain line in FIG. 3, and (ii) a neutral position in which the engaging element 4 is disengaged from the cam surface 1c and the cylindrical surface 2e, as shown by the solid lines in FIGS. 2 and 3. Each cam surface 1c is constituted by a single flat surface in the shown example, but may be constituted by a plurality of surface portions or a single curved surface. The clutch mechanism 5 of FIG. 1 is described below in detail. This clutch mechanism is similar to the clutch mechanism of the JP '678 publication discussed above.

Specifically, the clutch mechanism 5 includes a cage 10 retaining the engaging elements 4; a neutral spring 11 configured to be elastically deformed by the rotation of the cage 10 relative to the inner member 1; an armature 12 rotationally fixed relative to the cage 10; an electromagnet 13 axially opposed to the armature 12; a rotor 14 axially opposed to the armature 12 while being rotationally fixed relative to the outer member 2, as a second member of the inner and outer members 1 and 2; and a separation spring 15 biasing the armature 12 in the direction away from the rotor 14.

As illustrated in FIGS. 1 and 2, the cage 10 includes a plurality of circumferentially arranged pillars 10a; a first annular portion 10b integrally connected to the one axial end of each pillar 10a; and a second annular portion 10c integrally connected to the other axial ends of the pillars 10a.

Figure 3:
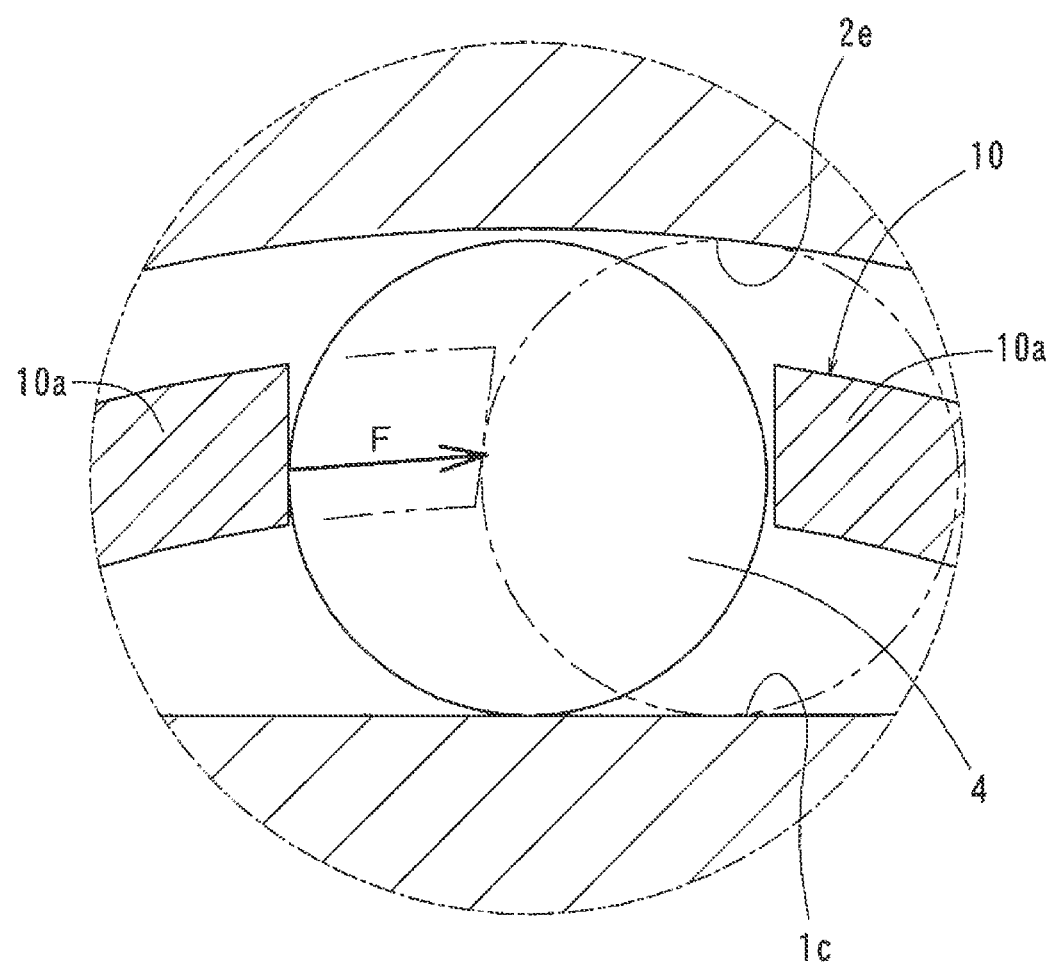
FIG. 3 is an enlarged view illustrating an engaging element of FIG. 2 and its vicinity.

As shown in FIGS. 2 and 3, the engaging elements 4 are received in the spaces between the respective circumferentially adjacent pairs of pillars 10a. As illustrated in FIG. 3, the circumferential positions of the engagement elements 4 relative to the cam surfaces 1c are limited by the abutment of the engagement elements 4 against the corresponding pillars 10a. Also, due to this abutment, the engaging elements 4 are forcibly rotated together with the cage 10.

As illustrated in FIG. 1, the first annular portion 10b includes an inwardly extending flange. The first annular portion 10b is rotatably fitted, at the inner periphery of the inwardly extending flange, to the outer periphery of the inner member 1. The cage 10 is axially positioned, at the flange of the first annular portion 10b, by a step of the cam ring portion 1b and the inner ring 3a.

The neutral spring 11 is an elastic member configured to be elastically deformed by the rotation of the cage 10 relative to the inner member 1 such that the cage 10 is rotated back to its original position by the restoring elasticity of the neutral spring. The neutral spring 11 elastically retains the cage 10 such that the engaging elements 4 are kept in the neutral position.

The neutral spring 11 is metal spring including a C-shaped ring portion, and a pair of outwardly extending engagement pieces 11a at both ends of the C-shaped ring portion. The ring portion of the neutral spring 11 is fitted in a recess formed in the side surface of the cam ring portion 1b at the other axial end thereof. The engaging pieces 11a are inserted into a cutout formed in the second annular portion 10c of the cage 10 through a cutout formed in the cam ring portion 1b. The engaging pieces 11b bias the cutout of the cam ring portion 1b and the cutout of the second annular portion 10c in the respective opposite directions, thereby retaining the cage 10 in a phase where the engaging elements 4 are kept in the neutral position.

The clutch mechanism 5 includes a spring retaining ring 16 retaining the neutral spring 11 in the recess of the cam ring portion 1b. The spring retaining ring 16 is fitted to the outer periphery of the inner member 1 so as to axially come into contact with the end surface of the cam ring portion 1b at the other axial end thereof. The movement of the spring retaining ring 16 toward the other axial end is prevented by a snap ring 17 fitted to the inner member 1. The neutral spring 11 may be disposed in a recess of the cam ring portion on the one axial end side thereof such that the pullout of the neural spring is prevented by the flange of the first annular portion 10b of the cage 10, while omitting the spring retaining ring.

The armature 12 is slidably fitted to the outer periphery of the inner member 1. The armature 12 and the cage 10 are rotationally fixed relative to each other via the spring retaining ring 16. Specifically, a rotationally fixing structure is used in which an engagement portion 16a of the spring retaining ring 16 is inserted in a cutout of the second annular portion 10c of the cage 10, and in an engagement hole of the armature 12. If the spring retaining ring is omitted, the rotationally fixing structure may comprise an engagement hole formed in the armature, and an engagement protruding piece of the cage that is inserted in the engagement hole of the armature.

The rotor 14 includes an inner cylindrical portion; an outer cylindrical portion located outwardly of the inner cylindrical portion; and an end wall portion connecting these cylindrical portions together. By press-fitting the outer cylindrical portion of the rotor 14 to the inner periphery of the outer member 2, the rotor 14 is attached to the outer member 2 so as to be rotatable, in unison with, and coaxially with, the outer member 2. The rotor may be fixed to the outer member via a rotor guide.

A bearing 18 is disposed between the outer periphery of the inner member 1 and the inner periphery of the rotor 14 so as to support the rotor 14 for rotation relative to the inner member 1.

The electromagnet 13 is disposed in the space between the inner and outer cylindrical portions of the rotor 14. The electromagnet 13 comprises a field core and a coil supported by the field core. The electromagnet 13 is fixed, at its field core, to the stationary member W. Instead, with the clutch mechanism 5 received in a housing as a stationary member, the electromagnet may be fixed to this housing.

The separation spring 15 is disposed between the opposed surfaces of the armature 12 and the rotor 14. The amount by which the armature 12 axially separates from the rotor 14 corresponds to an air gap g between the rotor 14 and the armature 12. This air gap is limited due to the separation of the armature 12 being restricted by the snap ring 17.

The movement of the inner member 1 toward the other axial end relative to the inner ring 3a is restricted by the second snap ring 8 within a range smaller than the air gap g. Therefore, even when, with the electromagnet 13 not excited, an axial load is applied which causes the inner member 1 to move toward the other axial end relative to the inner ring 3a, the rotor 14 and the armature 12 never come into abnormal contact with each other against the separation spring 15.

It is now described how the clutch mechanism 5 operates (see FIGS. 1 and 3 if necessary). In a non-excited state in which the coil of the electromagnet 13 is not energized, the engaging elements 4 are in the neutral position, and the cage 10 is retained, by the spring force of the neutral spring 11, in a phase where the engaging elements 4 are kept in the neutral position relative to the respective cam surfaces 1c. Therefore, even when the inner member 1 and the outer member 2 rotate relative to each other, torque is not transmitted between the inner member 1 and the outer member 2, so that the inner and outer members 1 and 2 rotate freely relative to each other. In other words, the clutch mechanism 5 is in a disengaged state in which the engaging elements 4 cannot engage with the inner member 1 and the outer member 2.

In a state in which the inner and outer members 1 and 2 are rotating relative to each other with at least one of the inner and outer members 1 and 2 actually rotating, when the coil of the electromagnet 13 is energized, the electromagnet 13 is excited, so that the armature 12 is magnetically attracted to the rotor 14 against the separation spring 15. At this time, the frictional resistance between the attracted surfaces of the rotor 14 and the armature 12 is larger than the spring force of the neutral spring 11. Therefore, the neutral spring 11 elastically deforms, thereby rotating the cage 10 relative to the inner member 1. Due to this relative rotation, the engaging elements 4 are wedged into narrow portions of the wedge-shaped spaces between the cylindrical surface 2e and the cam surfaces 1c, and engaged with the cylindrical surface 2e and the cam surfaces 1c, thereby enabling the transmission of torque between the inner member 1 and the outer member 2 through the engaging elements 4. In this way, the clutch mechanism 5 can electromagnetically switch the disengaged state to an engaged state in which the engaging elements 4 can engage with the inner and outer members 1 and 2.

When, in this engaged state, the coil of the electromagnet 13 is de-energized, the armature 12 is separated from the rotor 14 by the pressing force of the separation spring 15. When the armature 12 is separated from the rotor 14, due to the biasing force of the neutral spring 11, the cage 10 rotates relative to the inner member 1 in the direction opposite to the direction in which the cage 10 rotates toward the engaging position, so that the engaging elements 4 return to the neutral position while being pressed by the pillars 10a. In this way, the clutch mechanism 5 can electromagnetically switch the engaged state to the disengaged state in which the engaging elements 4 cannot engage with the inner and outer members 1 and 2.

For the rotation transmission device of FIG. 1, in its assembled state where the engaging elements 4 are disposed between the inner peripheral portion 2a of the outer member 2 and the inner member 1; the outer ring 3b is fitted to the inner peripheral portion 2a; the first snap ring 7 is attached to the inner peripheral portion 2a; and the inner ring 3a is fitted to the end portion 1a of the inner member 1, the second snap ring 8 can be attached to the end portion 1a of the inner ring 1 through the opening 2b of the outer member 2, and then the shaft 6 can be connected to the opening 2b. Therefore, in this rotation transmission device, the second snap ring 8 reliably restricts the movement of the inner member 1 toward the other axial end relative to the inner ring 3a, thereby preventing malfunction of the clutch mechanism 5.

Also, in this rotation transmission device, because (i) the shaft 6 includes a telescopically fitted portion 6d coaxially fitted to the opening 2b; (ii) the third snap ring 9 is attached to the opening 2b; (iii) the shaft 6 includes an engagement wall 6c axially opposed to the third snap ring 9; and (iv) the movement of the shaft 6 in its pullout direction relative to the outer member 2 is restricted by the third snap ring 9 and the engagement wall 6c, it is possible to prevent, by the third snap ring 9 and the engagement wall 6c, the shaft 6 from being pulled out relative to the outer member 2, and to unitize the shaft 6 and the outer member 2 as a single unit, while ensuring coaxial arrangement of the shaft 6 and the outer member 2 by the fitting of the telescopically fitted portion 6b to the opening 2b.

Also, in this rotation transmission device, because (i) the opening 2b includes a shoulder 2c for restricting the movement of the outer ring 3b toward the one axial end; (ii) the shoulder 2c and the shaft 6 are fitted to each other by spline fitting; and (iii) the shoulder 2c and the engagement wall 6c are axially in abutment with each other, it is possible to transmit torque between the shaft 6 and the outer member 2 by utilizing the shoulder 2c for restricting the outer ring, and also to restrict, by the shoulder 2c and engagement wall 6c, the movement of the shaft 6 in its insertion direction relative to the outer member 2.

Also, (i) this rotation transmission device includes a clutch mechanism 5 including a cage 10 retaining the engaging elements 4; a neutral spring 11 configured to be elastically deformed by the rotation of the cage 10 relative to the inner member 1 (first member); an armature 12 rotationally fixed relative to the cage 10; an electromagnet 13 axially opposed to the armature 12; a rotor 14 axially opposed to the armature 12 with the rotor 14 rotationally fixed relative to the outer member 2 (the second member); and a separation spring 15 pressing the armature 12 in the direction away from the rotor 14, (ii) the engaging elements 4 are movable, by the relative rotation of the cage 10, between the engagement position in which the engaging elements 4 are engaged with the outer member 2 and the inner member 1, and the neutral position in which the engaging elements 4 are disengaged from the outer member 2 and the inner member 1, (iii) when the electromagnet 13 is energized, the armature 12 is magnetically attracted to the rotor 14, and (iv) the movement of the inner member 1 toward the other axial end relative to the inner ring 3a is restricted by the second snap ring 8 within a range smaller the air gap g between the rotor 14 and the armature 12.

Therefore, the clutch mechanism 5 can function as a clutch mechanism of the excitation actuation type, and, even when, with the electromagnet 13 not excited, an axial load is applied which causes the inner member 1 to move toward the other axial end relative to the inner ring 3a, the rotor 14 and the armature 12 never come into abnormal contact with each other against the separation spring 15, thus preventing malfunction of the clutch mechanism 5.

(ii) the engaging elements 4 are movable, by the relative rotation of the cage 10, between the engagement position in which the engaging elements 4 are engaged with the outer member 2 and the inner member 1, and the neutral position in which the engaging elements 4 are disengaged from the outer member 2 and the inner member 1, (iii) when the electromagnet 13 is energized, the armature 12 is magnetically attracted to the rotor 14, and (iv) the movement of the inner member 1 toward the other axial end relative to the inner ring 3a is restricted by the second snap ring 8 within a range smaller the air gap g between the rotor 14 and the armature 12, the clutch mechanism 5 can function as a clutch mechanism of the excitation actuation type, and, even when, with the electromagnet 13 not excited, an axial load is applied which causes the inner member 1 to move toward the other axial end relative to the inner ring 3a, the rotor 14 and the armature 12 never come into abnormal contact with each other against the separation spring 15, thus preventing malfunction of the clutch mechanism 5.

While, in the example of FIG. 1, the second snap ring 8 is in abutment with the one axial end of the inner ring 3a, and thus the inner member 1 is substantially immovable toward the other axial end relative to the inner ring 3a, it is not an essential requirement to bring the second snap ring 8 into abutment with the inner ring 3a. It is only required that the movement of the inner member 1 be restricted to such an extent that the rotor 14 and the armature 12 do not come into abnormal contact with each other with the electromagnet 13 not excited.

In this rotation transmission device, oil lubrication may be used which means that the interior of the rotation transmission device is lubricated by oil supplied from the machine, or grease lubrication may be used which means that the interior of the rotation transmission device is lubricated by grease sealed beforehand in the interior of the rotation transmission device. In FIG. 1, the oil lubrication is assumed, and thus the rotation transmission device includes no sealing structure. If the grease lubrication is used, the rotation transmission device is designed to have a sealing structure. FIG. 4 illustrates a second embodiment as such an example. Only the features of the second embodiment different from those of the first embodiment are described below, and the elements of the second embodiment corresponding to those of the first embodiment are denoted by the same reference numerals.

The rotation transmission device of the second embodiment includes an O-ring 20 between the opening 2b of the outer member 2 and the telescopically fitted portion 6d of the shaft 6. The opening 2b has a groove 2f retaining the O-ring 20. The cylindrical surface 2d is formed on both sides of the groove 2f. Therefore, when inserting the telescopically fitted portion 6d of the shaft 6 into the opening 2b, it is possible to retain the O-ring 20 in the groove 2f, and to seal the space between the telescopically fitted portion 6d and the opening 2b by the O-ring 20, thereby preventing grease from leaking from the one axial end side of the rotation transmission device.

An oil seal 21 is disposed between the inner member 1 and the rotor 14. The rotor 14 generally has slits for increasing its force attracting the armature 12, but in this embodiment, the slits are closed by non-magnetic elements 22, thereby eliminating any through holes in the rotor 14. By providing the oil seal 21 and closing the through holes in the rotor 14, it is possible to prevent grease from leaking from the other axial end side of the rotation transmission device.

While the clutch mechanism of the excitation actuation type is exemplified in each of the above embodiments, the non-excited type may be used instead, provided the clutch mechanism is capable of switching the state of the engaging elements electromagnetically, i.e., using the electromagnetic force generated by energizing the coil of the electromagnet, between the engageable state in which the engaging elements can engage with the inner member and the outer member, and the unengageable state in which the engaging elements cannot engage with the inner member and the outer member. As the engaging elements, sprags may be used, and the inclination positions of the sprags may be controlled by the relative rotation of the cage. While, in the embodiments, the cylindrical surface 2e is formed on the outer member 2, the cylindrical surface may be formed on the inner member with the cam surfaces formed on the inner peripheral portion of the outer member.

The above-described embodiments are mere examples in every respect, and the present invention is not limited thereto. Therefore, the scope of the present invention is indicated not by the above description but by the claims, and should be understood to include all modifications within the scope and meaning equivalent to the scope of the claims.

DESCRIPTION OF REFERENCE NUMERALS

1: Inner member
1a: End portion
2: Outer member
2a: Inner peripheral portion
2b: Opening
2c: Shoulder
2f: Groove
3: Rolling bearing
3a: Inner ring
3b: Outer ring
4: Engaging element
5: Clutch mechanism
6: Shaft
6c: Engagement wall
6d: Telescopically fitted portion
7: First snap ring
8: Second snap ring
9: Third snap ring
10: Cage
11: Neutral spring
12: Armature
13: Electromagnet
14: Rotor
15: Separation spring
20: O-ring

The invention claimed is:

1. A rotation transmission device comprising:
an inner member;
an outer member having an inner peripheral portion disposed outwardly of the inner member;
a rolling bearing disposed between the inner peripheral portion of the outer member and an end portion of the inner member at a first axial end thereof;
engaging elements disposed between the inner member and the inner peripheral portion of the outer member;
a clutch mechanism configured to electromagnetically switch a state of the engaging elements between an engageable state, in which the engaging elements are capable of engaging with the inner member and the outer member, and an unengageable state, in which the engaging elements are incapable of engaging with the inner member and the outer member; and
a first snap ring attached to the inner peripheral portion of the outer member,
wherein the rolling bearing includes an inner ring fitted to the end portion of the inner member, and an outer ring fitted to the inner peripheral portion of the outer member,
wherein the first snap ring is arranged to restrict movement of the outer ring toward a second axial end of the inner member,
wherein the rotation transmission device further comprises:
a shaft connected to the outer member so as to be rotatable in unison with and coaxially with the outer member; and
a second snap ring attached to the end portion of the inner member so as to be located on the first axial end the inner ring,
wherein the outer member has, at a first axial end thereof, an opening integral with the inner peripheral portion,
wherein the second snap ring is attachable to the end portion of the inner member through the opening,
wherein movement of the inner member toward the second axial end of the inner member relative to the inner ring is restricted by the second snap ring,
wherein the shaft is connected to the outer member at the opening,
wherein the rotation transmission device further comprises a third snap ring attached to the outer member at the opening,
wherein the shaft includes a telescopically fitted portion coaxially fitted to the opening, and includes an engagement wall axially opposed to the third snap ring, and
wherein movement of the shaft in a pullout direction relative to the outer member is restricted by the third snap ring and the engagement wall.

2. The rotation transmission device according to claim 1, wherein the opening includes a shoulder configured to restrict movement of the outer ring toward the first axial end, wherein the shoulder and the shaft are fitted together by spline fitting, and wherein the shoulder and the engagement wall are axially in abutment with each other.

3. The rotation transmission device according to claim 2, further comprising an O-ring between the opening of the outer member and the telescopically fitted portion of the shaft, wherein the opening has a groove retaining the O-ring.

4. The rotation transmission device according to claim 2, wherein the clutch mechanism includes:
   a cage retaining the engaging elements;
   a neutral spring configured to be elastically deformed by relative rotation of the cage relative to a first member of the inner member and the outer member;
   an armature rotationally fixed relative to the cage;
   an electromagnet axially opposed to the armature;
   a rotor axially opposed to the armature with the rotor rotationally fixed relative to a second member of the inner member and the outer member; and
   a separation spring pressing the armature in a direction away from the rotor,
   wherein the engaging elements are arranged so as to be movable, due to the relative rotation of the cage, between an engagement position, in which the engaging elements are engaged with the outer member and the inner member, and a neutral position, in which the engaging elements are not engaged with the outer member and the inner member,
   wherein the armature is configured to be magnetically attracted to the rotor when the electromagnet is energized, and
   wherein the movement of the inner member toward the second axial end relative to the inner ring is restricted by the second snap ring to within a range smaller than an air gap between the rotor and the armature.

5. The rotation transmission device according to claim 1, further comprising an O-ring between the opening of the outer member and the telescopically fitted portion of the shaft, wherein the opening has a groove retaining the O-ring.

6. The rotation transmission device according to claim 5, wherein the clutch mechanism includes:
   a cage retaining the engaging elements;
   a neutral spring configured to be elastically deformed by relative rotation of the cage relative to a first member of the inner member and the outer member;
   an armature rotationally fixed relative to the cage;
   an electromagnet axially opposed to the armature;
   a rotor axially opposed to the armature with the rotor rotationally fixed relative to a second member of the inner member and the outer member; and
   a separation spring pressing the armature in a direction away from the rotor,
   wherein the engaging elements are arranged so as to be movable, due to the relative rotation of the cage, between an engagement position, in which the engaging elements are engaged with the outer member and the inner member, and a neutral position, in which the engaging elements are not engaged with the outer member and the inner member,
   wherein the armature is configured to be magnetically attracted to the rotor when the electromagnet is energized, and
   wherein the movement of the inner member toward the second axial end relative to the inner ring is restricted by the second snap ring to within a range smaller than an air gap between the rotor and the armature.

7. The rotation transmission device according to claim 1, wherein the clutch mechanism includes:
   a cage retaining the engaging elements;
   a neutral spring configured to be elastically deformed by relative rotation of the cage relative to a first member of the inner member and the outer member;
   an armature rotationally fixed relative to the cage;
   an electromagnet axially opposed to the armature;
   a rotor axially opposed to the armature with the rotor rotationally fixed relative to a second member of the inner member and the outer member; and
   a separation spring pressing the armature in a direction away from the rotor,
   wherein the engaging elements are arranged so as to be movable, due to the relative rotation of the cage, between an engagement position, in which the engaging elements are engaged with the outer member and the inner member, and a neutral position, in which the engaging elements are not engaged with the outer member and the inner member,
   wherein the armature is configured to be magnetically attracted to the rotor when the electromagnet is energized, and
   wherein the movement of the inner member toward the second axial end relative to the inner ring is restricted by the second snap ring to within a range smaller than an air gap between the rotor and the armature.

* * * * *